United States Patent [19]

Posner

[11] Patent Number: 4,871,100
[45] Date of Patent: Oct. 3, 1989

[54] SHOPPING BAG

[76] Inventor: Brian Posner, Sutton Grange, Parvey Lane, Sutton, Macclesfield, Cheshire, England

[21] Appl. No.: 213,117
[22] Filed: Jun. 29, 1988

[30] Foreign Application Priority Data

Sep. 17, 1987 [GB] United Kingdom ............... 8721877

[51] Int. Cl.$^4$ .............................................. B65D 33/14
[52] U.S. Cl. ............................. 224/42.46 R; 224/273; 383/7; 383/23; 280/DIG. 4; 280/33.992
[58] Field of Search ............... 224/42.42 R, 42.46 R, 224/273, 42.01; 383/7, 22, 23, 24, 12; 220/404; 280/DIG. 3, DIG. 4, 33.99 A, 33.99 B

[56] References Cited

U.S. PATENT DOCUMENTS

| | | | |
|---|---|---|---|
| 1,623,107 | 4/1927 | Goodykoontz | 383/7 |
| 1,955,385 | 4/1934 | Gray | 220/404 |
| 2,324,440 | 7/1943 | Tormohlen | 220/404 |
| 2,716,558 | 8/1955 | Sullivan | 280/DIG. 3 |
| 4,376,502 | 3/1983 | Cohen | 224/42.46 R |
| 4,560,096 | 12/1985 | Lucas et al. | 224/42.42 R |
| 4,769,126 | 9/1988 | Roen et al. | 383/7 |

FOREIGN PATENT DOCUMENTS

| | | | |
|---|---|---|---|
| 2454724 | 5/1976 | Fed. Rep. of Germany | 224/42.42 R |
| 8704985 | 8/1987 | PCT Int'l Appl. | 280/33.99 A |
| 2113621 | 8/1983 | United Kingdom | 280/33.99 A |
| 2116490 | 9/1983 | United Kingdom | 280/33.99 A |

Primary Examiner—Henry J. Recla
Assistant Examiner—Robert M. Fetsuga
Attorney, Agent, or Firm—Wallenstein Wagner & Hattis, Ltd.

[57] ABSTRACT

A shopping bag for use with a supermarket shopping cart has a rectangular base and foldable sides with stiff upper edges for hooking over the sides of the basket of the cart.

8 Claims, 4 Drawing Sheets

SHOPPING BAG

DESCRIPTION

1. Technical Field

This invention relates to shopping bags.

2. Background Prior Art

Shopping nowadays tends to be done in supermarkets, by car. As a result, a single shopping trip results in the purchase of groceries sufficient to maintain a family for a week or more, and supermarkets provide carts into which items are placed from the shelves for eventual presentation at the checkout desk. These carts hold a considerable volume of purchases.

Problems arise, however, at the checkout desk, when the purchases are removed from the cart. Supermarkets provide free or inexpensive plastic bags often designed for single trip use. Usually, for a typical supermarket purchase, the contents of the cart, when checked out, have to be placed into several of the plastic bags. If there are more than one or two such bags full of purchases, they can be loaded into the cart, which can then be pushed to the car.

Often, however, the plastic bags are small and difficult to pack with large items, or they are flimsy and liable to tear when loaded with heavy, canned or bottled goods.

Moreover, when packing the filled bags into a car trunk, they are not selfsupporting and the motion of the car frequently upsets them, spilling some of the contents.

SUMMARY OF THE INVENTION

The present invention provides a shopping bag specially adapted for supermarket shopping, which avoids these problems.

The invention comprises a shopping bag adapted for use with a supermarket shopping cart, comprising a stiffened rectangular base adapted to fit into a shopping cart and foldable sides upstanding from the base and with an open top, two opposed sides having stiffened upper edges adapted to hang from the upper edges of a shopping cart basket, whereby to hold the bag open in the cart.

The said stiffened upper edges may have arcuate slots convex towards the base adapted to fit over the upper edges of side walls of a shopping cart. In another arrangement, the said stiffened upper edges having projecting tongue members adapted to hook over the upper edges of side walls of a shopping cart.

Said stiffened upper edges may comprise carrying handles, and may have slots (additional to and above the arcuate slots aforesaid, perhaps) defining carrying handles.

The base may be foldable along a median line parallel to the stiffened upper edges. The bag may then be folded into a small carrying or storage pack.

The sides an bases may be fashioned from two mirror-image pieces of material joined together along a median line parallel to the stiffened upper edges. The base may then be stiffened by boards.

The bag may be made from a heatweldable plastic material.

BRIEF DESCRIPTION OF DRAWINGS

One embodiment of a shopping bag according to the invention will now be described with reference to the accompanying drawings, in which.

DETAILED DESCRIPTION

Figure 2:
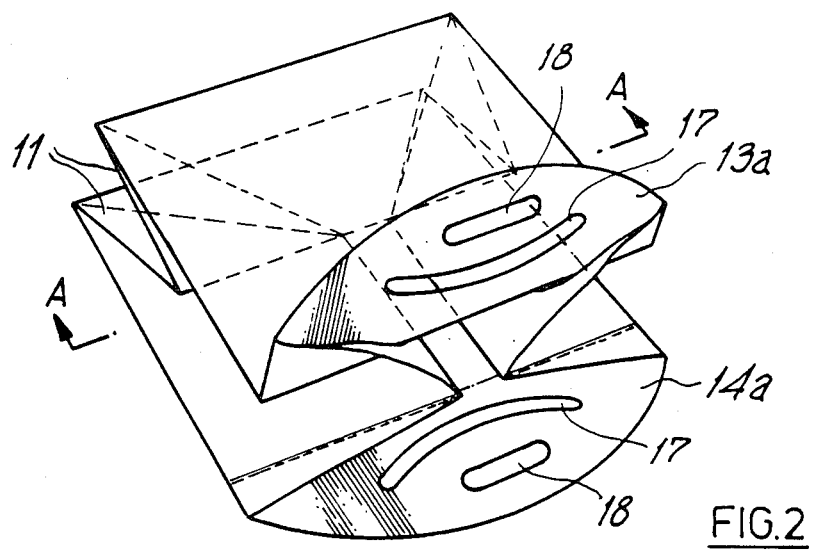
FIG. 2 is a view of the bag partially folded.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

Figure 5:
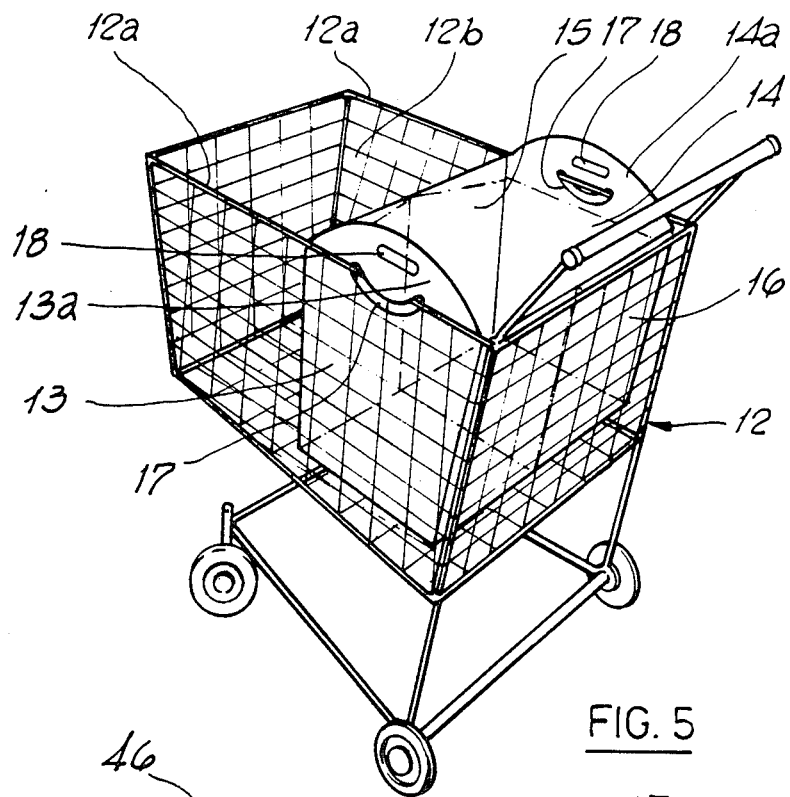
FIG. 5 is a view of the bag in a shopping cart.

The shopping bag illustrated in the drawings comprises a stiffened rectangular base 11 adapted to fit into a shopping cart 12 (FIG. 5) and foldable sides 13–16 upstanding from the base 11 and with an open top, two opposed sides 13, 14 having stiffened upper edges 13a, 14a adapted to hang from the upper edges 12a of the shopping cart basket 12b, whereby to hold the bag open in the cart.

Figure 4:
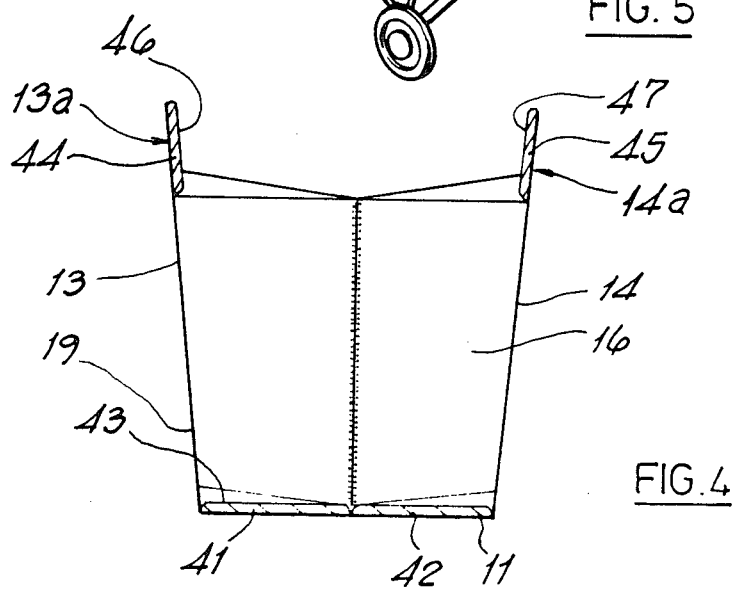
FIG. 4 is a section through the bag showing the stiffening of the base and upper edges.

Said stiffened upper edges 13a, 14a have arcuate slots 17 convex towards the base 11 and adapted to hook over the upper edges 12a of the cart basket 12b, as seen more clearly in FIG. 4.

The stiffened upper edges 13a, 14a comprise carrying handles, having slots 18, above the arcuate slots 17, defining the same.

The base 11 is foldable along a median line 11a parallel to the stiffened upper edges. This enables the bag to be folded as illustrated in FIG. 2. Because the sides 11–16 are of flexible, foldable material, the bag can be further folded about the dashed lie A—A of FIG. 2 and the stiffened upper edges 13a, 14a also folded back (as shown for edge 13a) to pack the bag down to a convenient carrying or storage size.

FIG. 4 illustrates the construction of the base 11 and the stiffened upper edge 13a, 14a. The sides 13–16 and base 11 are fashioned from two mirror-image pieces 19 of material joined together along a meridian line parallel to the stiffened edges 13a, 14a.

Inserts 41, 42 of stiff board are contained between the pieces 19 and a cover 43 secured to the pieces 19 around the inserts 41, 42 and between them to form the folding, flat base 11. In the opened-out configuration of FIG. 1, the base can easily fold with its median line moving upwardly, but is constrained against folding the other way, which would effectively render the construction useless as a flat-bottomed carrying bag, by the sides 15, 16.

Inserts 44, 45 of board are likewise contained between the pieces 19 and covers 46, 47 to form the stiffened upper edges 13a, 14a.

The material of the pieces 19 and the covers 43, 46 and 47 is heat-weldable plastic material, such as polyvinyl chloride. The covers 43, 46 and 47 are welded to the pieces 19 around the inserts 41, 42, 44 and 45 and are welded to each other along their median join line. In addition, heat-impressed fold lines 48 are made at the edges 49 of the side walls to encourage the bag to fold naturally at these edges.

The covers 43, 46 and 47 extend beyond the board inserts 41, 42, 44 and 45 around the upper and lower edges of the sides 15, 16 and are attached to them to provide reinforcement.

Figure 1:
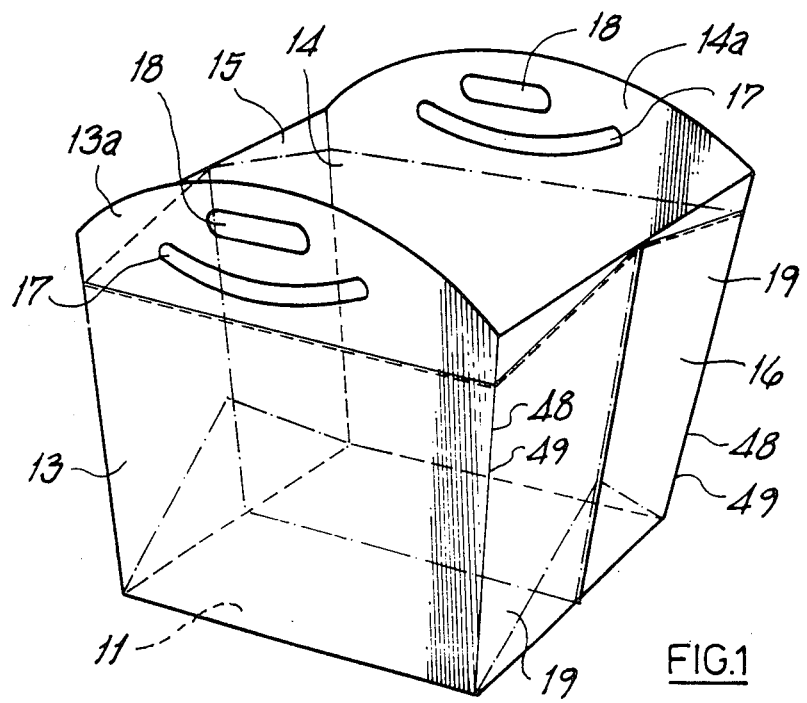
FIG. 1 is a perspective view of the opened bag.
Figure 3:
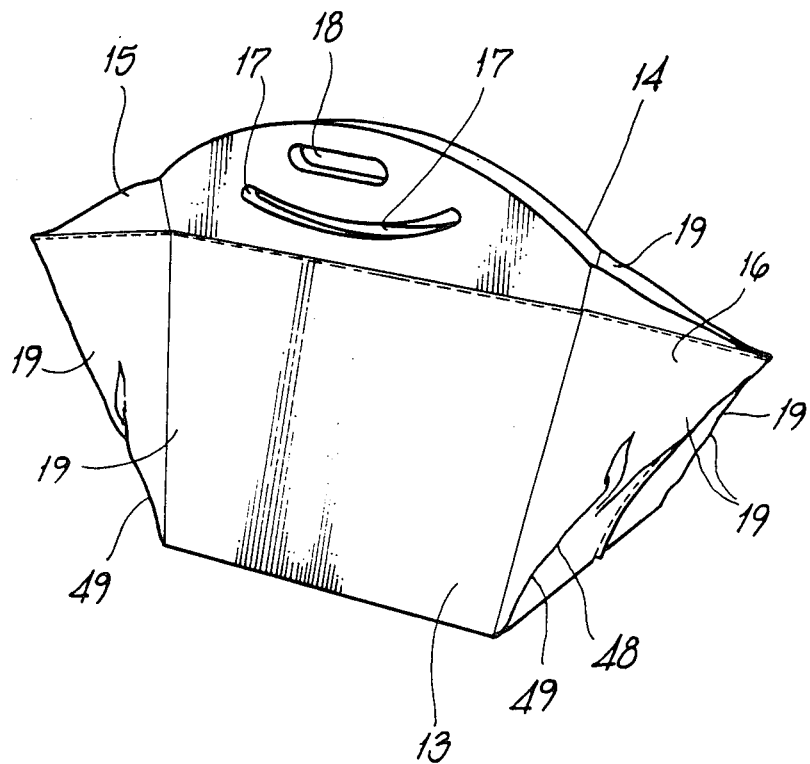
FIG. 3 is a view of the bag in a carrying configuration.

The stiffened upper edges 13a, 14a can also be folded back, as shown in FIG. 2, when the bag is in the opened-out configuration shown in FIG. 1, and may then serve to hook over its upper edges of a cart basket, instead of using the arcuate slots 17.

In FIG. 1's opened-out configuration, the full bag may be handled by two people, one on each handle, of course.

Figure 6:
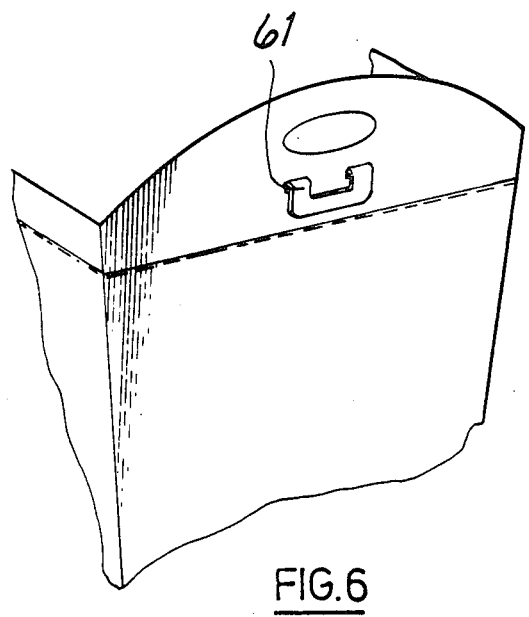
FIG. 6 is a view of an alternative hook arrangement

FIG. 6 illustrates an alternative hook arrangement where projecting tongues 61 are provided instead of the arcuate slots 17 to hook over the upper edges of side walls of a shopping cart.

While the specific embodiments have been illustrated and described, numerous modifications come to mind without significantly departing from the spirit of the invention and the scope of protection is only limited by the scope of the accompanying claims.

I claim:

1. A shopping bag adapted for use with supermarket shopping carts, the bag comprising:
   a stiffened rectangular base so dimensioned as to fit into a typical supermarket shopping cart and so that the bag can accommodate a considerable volume of purchases;
   foldable sides upstanding from the base so as to afford an open top to the bag;
   two opposed sides of said foldable sides having stiffened upper edges;
   hanger means provided in said stiffened upper edges whereby said opposed sides are adapted to hang from the upper edges of a shopping cart, whereby to hold said opposed sides open in said cart, and,
   structure-forming arcuate slots formed in said stiffened upper edges of the two opposed sides of the bag, the arcuate slots being convex towards the base of the bag whereby to adapt the two opposed sides of the bag to hook over the upper edges of the side walls of the supermarket shopping cart, thereby to hang the bag therefrom.

2. A bag according to claim 1, comprising structure-forming slots formed in said stiffened upper edges of the two opposed sides of the bag, the slots defining carrying handles with which to carry the bag when it contains purchases.

3. A bag according to claim 1, comprising structure-forming arcuate slots in said stiffened upper edges of the opposed sides of the bag, the arcuate slots being convex towards the base of the bag whereby to serve as carrying handles and to adapt the two opposed sides of the bag to hook over the upper edge of the side walls of the supermarket shopping cart thereby to hang the bag therefrom.

4. A bag according to claim 1, comprising projecting tongue members on said stiffened edges of the two opposed sides of the bag, adapted to hook over the upper edges of the side walls of the supermarket shopping cart.

5. A bag according to claim 1, comprising carrying handles on said stiffened edges of the two opposed sides of the bag, with which to carry the bag when the bag contains purchases.

6. A bag according to claim 1, comprising a median fold line in the base parallel to the stiffened upper edges of the bag.

7. A bag according to claim 1, in which one each of two foldable opposing sides of the bag and one half of the base of the bag as defined by a median line parallel to the stiffened upper edges of the foldable sides of the bag upstanding from said base are fashioned from mirror-image pieces of material joined together along a median line parallel to the stiffened upper edges of said two opposed foldable sides.

8. A bag according to claim 1, made from heat-weldable plastic material and having heat-impressed fold lines in the side walls of the bag.

* * * * *